US011278149B2

(12) United States Patent
Ulman et al.

(10) Patent No.: US 11,278,149 B2
(45) Date of Patent: Mar. 22, 2022

(54) REUSABLE BREWING FILTER WITH EJECTION MECHANISM

(71) Applicants: Leonid Ulman, San Diego, CA (US); Jeffery William Domenighini, San Diego, CA (US)

(72) Inventors: Leonid Ulman, San Diego, CA (US); Jeffery William Domenighini, San Diego, CA (US)

( * ) Notice: Subject to any disclaimer, the term of this patent is extended or adjusted under 35 U.S.C. 154(b) by 70 days.

(21) Appl. No.: 15/482,827

(22) Filed: Apr. 10, 2017

(65) Prior Publication Data

US 2018/0290821 A1 Oct. 11, 2018

(51) Int. Cl.
*A47J 31/06* (2006.01)

(52) U.S. Cl.
CPC .......... *A47J 31/0689* (2013.01); *Y02W 30/80* (2015.05)

(58) Field of Classification Search
CPC .............................. A47J 31/0689; Y02W 30/80
USPC ........... 99/279, 295, 323; 426/115, 433, 434
See application file for complete search history.

(56) References Cited

U.S. PATENT DOCUMENTS

| 6,658,989 B2 | 12/2003 | Sweeney et al. |
| 8,291,812 B2 | 10/2012 | Rivera |
| 8,522,669 B1* | 9/2013 | Rolfes ................ B65D 85/8046 426/132 |
| 8,707,855 B2 | 4/2014 | DeMiglio et al. |
| 9,402,501 B1* | 8/2016 | Vu ...................... A47J 31/3623 |
| 2009/0229470 A1* | 9/2009 | Dorfmueller ....... A47J 31/0689 99/295 |
| 2009/0314166 A1* | 12/2009 | Galbis ..................... A47J 31/44 99/289 R |
| 2011/0303095 A1* | 12/2011 | Fu .......................... A47J 31/08 99/317 |
| 2012/0285334 A1* | 11/2012 | DeMiglio ........... A47J 31/0689 99/300 |
| 2013/0017303 A1* | 1/2013 | Vu ..................... A47J 31/0689 426/433 |
| 2013/0340626 A1* | 12/2013 | Oh .................... B65D 85/8043 99/295 |
| 2014/0174300 A1* | 6/2014 | Husband ............. A47J 31/0689 99/323 |
| 2014/0298998 A1* | 10/2014 | Brendle ............. A47J 31/3614 99/289 R |
| 2014/0345473 A1* | 11/2014 | Albritton ................ A47J 31/08 99/323 |
| 2015/0027315 A1* | 1/2015 | Lussi .................... A47J 31/401 99/285 |
| 2015/0368033 A1* | 12/2015 | Krug .................... A47J 31/407 426/112 |

* cited by examiner

*Primary Examiner* — Nina Bhat

(57) ABSTRACT

A reusable brewing filter, also known as a brewing pod or adapter, for brewing systems. The reusable filter incorporates an internal rotatable scraping or ejection mechanism to facilitate the disposal of spent coffee grounds or other extracted and brewed materials.

16 Claims, 6 Drawing Sheets

REUSABLE BREWING FILTER WITH EJECTION MECHANISM

CROSS-REFERENCE TO RELATED APPLICATIONS

This application claims the benefit of priority to U.S. Provisional Application Ser. No. 62/320,574 filed Apr. 10, 2016.

STATEMENT REGARDING FEDERALLY FUNDED RESEARCH

Not Applicable

FIELD OF THE INVENTION

The present invention relates to reusable adapters, also known as brewing filters and brew pods, for single serve brewing machines.

BACKGROUND

Coffee is a beverage that may be brewed using water as a solvent to steep and extract components from ground coffee beans. The coffee is placed in a basket type holder having a section of the basket in which the water for extraction is poured and one or more sections from which extract water may be dispensed or removed after steeping the ground coffee. The extracted coffee water is then drunk as a beverage. Other materials may also be brewed and extracted, such as tea, beer, fruit, vegetables, and other organic matter. Small baskets, which may be disposable or re-usable, have been created to hold one or more servings of measured ground coffee beans for extraction. The small baskets are also called brewing filters, brewing pods, adapters, or enclosures. Current reusable brewing filters are cleaned after use to remove spent ground coffee by the user having to scrape, bang, and rinse out old coffee grounds or tea grounds. The reusable brewing filters, pods, or adapters that exist consist of a housing and lid with no integrated cleaning mechanism. In addition, the currently available manual methods of cleaning a reusable brewing filter are inefficient and messy.

The present invention incorporates an integrated arm into the coffee basket or brewing filter that can cleanly and closely sweep the spent coffee grounds from the basket or brewing filter thus enabling ejection and disposal of the spent coffee grounds.

Current reusable filters or adapters for single-serve coffee brewing machines, for example, consist of an open enclosure or housing, a lid, and fine mesh screens with the purpose of receiving the ground coffee beans to hold for brewing, having water from a vessel or brewing machine poured over or run through the enclosure and housed ground coffee beans, optionally steeping the coffee for some period of time to extract an optimal amount of components from the ground coffee beans, and then releasing the brewed liquid through the fine mesh screens into another vessel.

The spent coffee beans must be removed from the basket or brewing filter in order to reload and reuse the basket or brewing filter. Currently, the user has to manually remove the remnant spent coffee bean material from the cavity of the brewing filter or the enclosure which is difficult and time consuming.

Disclosures for the single-serve brewing filter exist in the prior art. In U.S. Patent Application No. US20150099042 A1, Koenig, Y. discloses a basket or brewing filter that has a double walled design with a film cover to allow recirculation of the water against the film cover to pass through the ground coffee beans repeatedly to enhance extraction. However, the disclosure does not describe a means to remove spent coffee beans from the basket or brewing filter.

In U.S. Patent Application No. US20120207896 A1, Rivera, A. discloses a reusable basket or brewing filter which sits in a brewing chamber having a lower offset exit port to allow longer steeping and enhanced extraction of the ground coffee beans. However, the spent coffee beans must be cleaned from the basket or brewing filter without the use of an integrated cleaning device. There is no improvement in a cleaning process.

In U.S. Pat. No. 8,720,320 B1, Rivera, A. discloses a basket or brewing filter that has spaced apart protrusions arranged on the brewing filter support surface that create gaps to facilitate flow of brewed beverage. The device described by Rivera, A. also has a spring mechanism to tamp or compress the ground coffee beans to enhance packing and flow of water through the ground coffee during the extraction process. However, the spent coffee beans, must be cleaned from the basket or brewing filter without an integrated cleaning mechanism and there is no improvement in the filter cleaning process.

There is a need for an integrated and efficient mechanical means to remove the spent coffee beans from a reusable basket or brewing filter.

SUMMARY

The present invention provides a reusable adapter, also known as a brewing filter, for coffee brewing systems. The present invention integrates a cleaning mechanism to facilitate the disposal of spent coffee contents from within the brewing filter. The present invention provides an integrated cleaning means or cleaning mechanism to clean the reusable brewing filter. The integrated cleaning mechanism sits within the brew brewing filter and is rotated to scrape the walls within the brewing filter that holds the material to be extracted. The user inverts the reusable brewing filter of the present invention over a disposal container and rotates the cleaning mechanism by rotation of the cleaning mechanism, externally from the reusable brewing filter, in order to discharge and eject the spent extracted material.

In one embodiment, the present invention holds enough ground coffee for what is typically a single serving of coffee to be extracted. The single serving amount may be one to two tablespoons of ground coffee. In another embodiment the present invention is large enough to hold more than two tablespoons of ground coffee to provide for extraction of more than one serving of coffee liquid.

DETAILED DESCRIPTION

Figure 1:
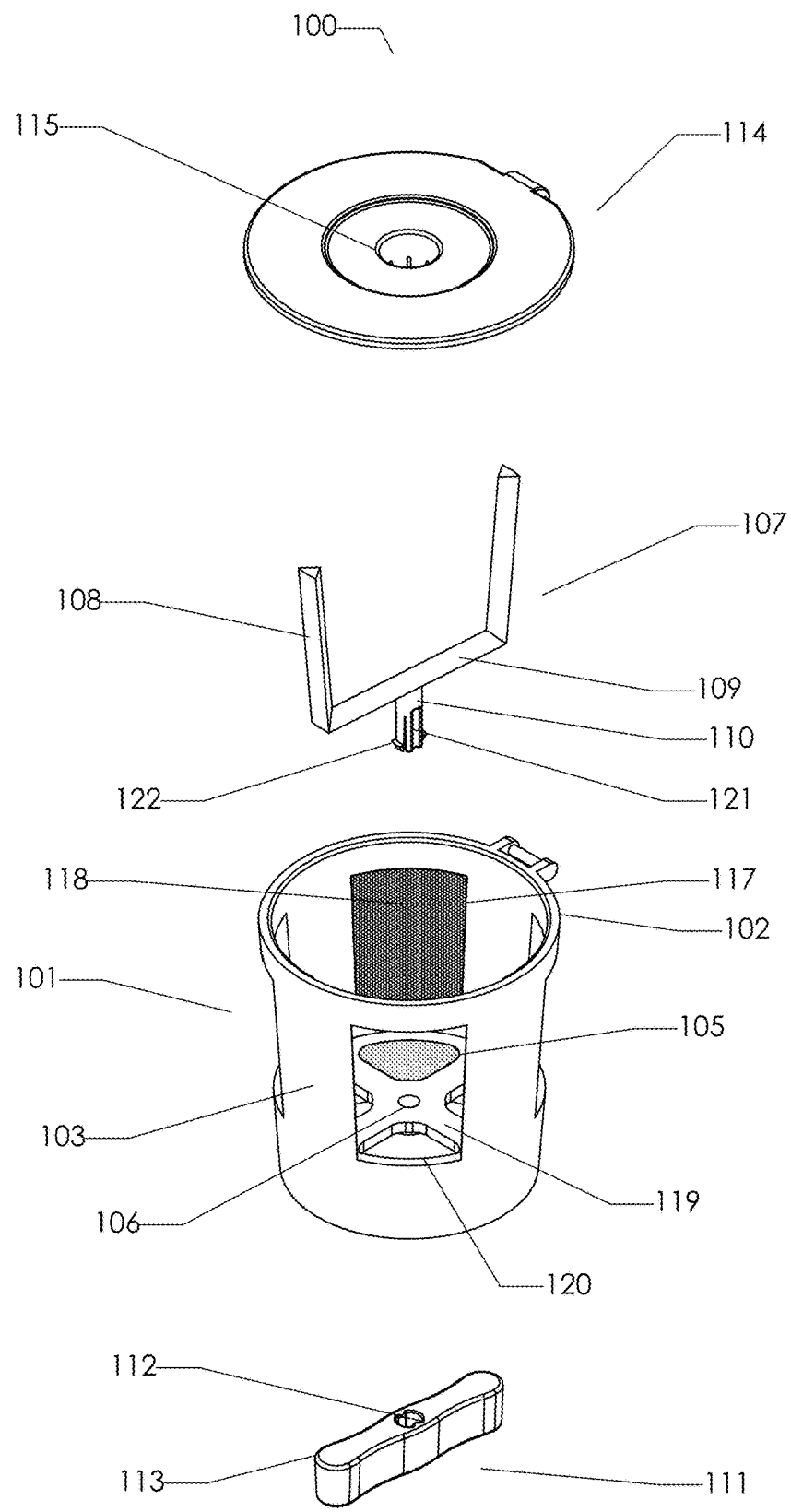
FIG. 1 illustrates an exploded isometric top view of the present invention.

The following descriptions are considered to be illustrative of the principles of the present invention and are not intended to be limiting. One of skill in the art will recognize and understand that there are suitable modifications and equivalents that may be used which fall within the scope of the invention described herein. The use of singular forms "a," "an," and "the" include plural references unless the context clearly requires otherwise. The embodiments are not limited to those illustrated in the drawings. It should also be understood that the drawings are not necessarily to scale. In certain instances, details may have been omitted that are not necessary for an understanding of the embodiments disclosed herein, for example, conventional fabrication and assembly.

Referring to FIG. 1, a reusable brewing adapter, 100, of the present invention is illustrated comprising a shell, 101, which has an interior, an interior surface, and an exterior surface. The shell, 101, further comprises a top section, 102, the top section having at least one vertical side wall, 103, wherein the at least one vertical side wall has an interior surface and an exterior surface, and a base, 104. The base, 104, further has an interior surface and an exterior surface. The base, 104, defines at least one drain hole, 105, and separately one shaft hole, 106, wherein the shaft hole, 106, has a lower end.

FIG. 1, shows that the reusable brewing adapter, 100, further comprises a cleaning scraper, 107, wherein the cleaning scraper has at least one vertical cleaning wing, 108, and at least one horizontal cleaning member, 109, which is attached to the at least one vertical cleaning wing, 108. The at least one horizontal cleaning member, 109, further has a vertical cylindrical shaft, 110, formed therein at the center point of the at least one horizontal cleaning member, 109, which vertical cylindrical shaft, 110, is positioned so that it opposes the at least one vertical cleaning wing, 108, the vertical cylindrical shaft, 110, having an end.

FIG. 1, further illustrates a wing lever, 111, which wing lever, 111, has a bore-through at its midpoint which bore-through has walls that further define a cleaning member retaining hole, 112. The cleaning member retaining hole, 112, and the wing lever, 111, that defines the cleaning member retaining hole, 112, further has indentations therein within the walls of the bore-through.

The base, 104, extends below and past the at least one vertical side wall, 103, in order to cover the wing lever, 111, facilitate the use of the wing lever, and afford a stable surface for the base, 104, to rest within the brewing machine or on a flat surface outside of the brewing machine.

Optionally, as shown in FIG. 1, in order to facilitate the use of and a spinning action of the wing lever, 111, an additional gripping piece may be mated with or formed within the wing lever, 111, such as a wing lever tab, 113. The wing lever tab, 113, provides the user with a comfortable and accessible means of grasping the wing lever, 111. In addition, the wing lever tab, 113, creates leverage for a stronger torque applied to the wing lever, 111.

Figure 2:
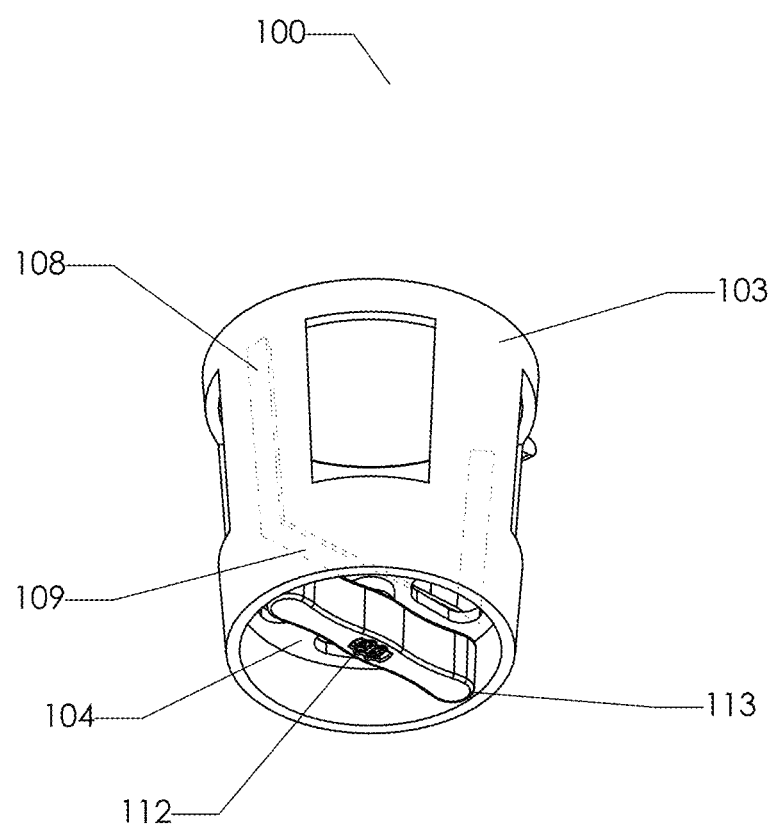
FIG. 2 illustrates an isometric bottom view of the present invention.

As illustrated in FIG. 2, the vertical cylindrical shaft, 110, is inserted into the shaft hole, 106, passed through the lower end and then inserted into the cleaning member retaining hole, 112, of the wing lever, 111. The wing lever, 111, is thus attached to the cleaning scraper, 107, so that the wing lever, 111, may be spun freely from the exterior of the shell, 101, in order to spin the cleaning scraper, 107, to clean the interior of the shell, 101.

Figure 3:
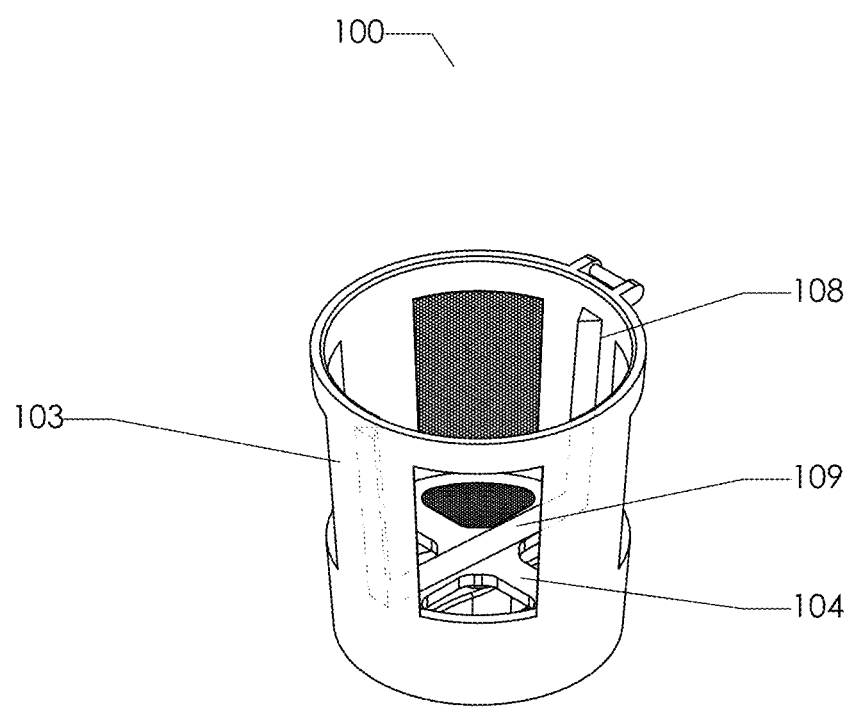
FIG. 3 illustrates an isometric top view of the present invention.

In another embodiment, as illustrated from the top view in FIG. 3, the at least one vertical cleaning wing, 108, is shown to abut the interior surface of the at least one vertical side wall, 103, and the at least one horizontal cleaning member, 109, intimately abuts the interior surface of the base, 104.

Figure 4:
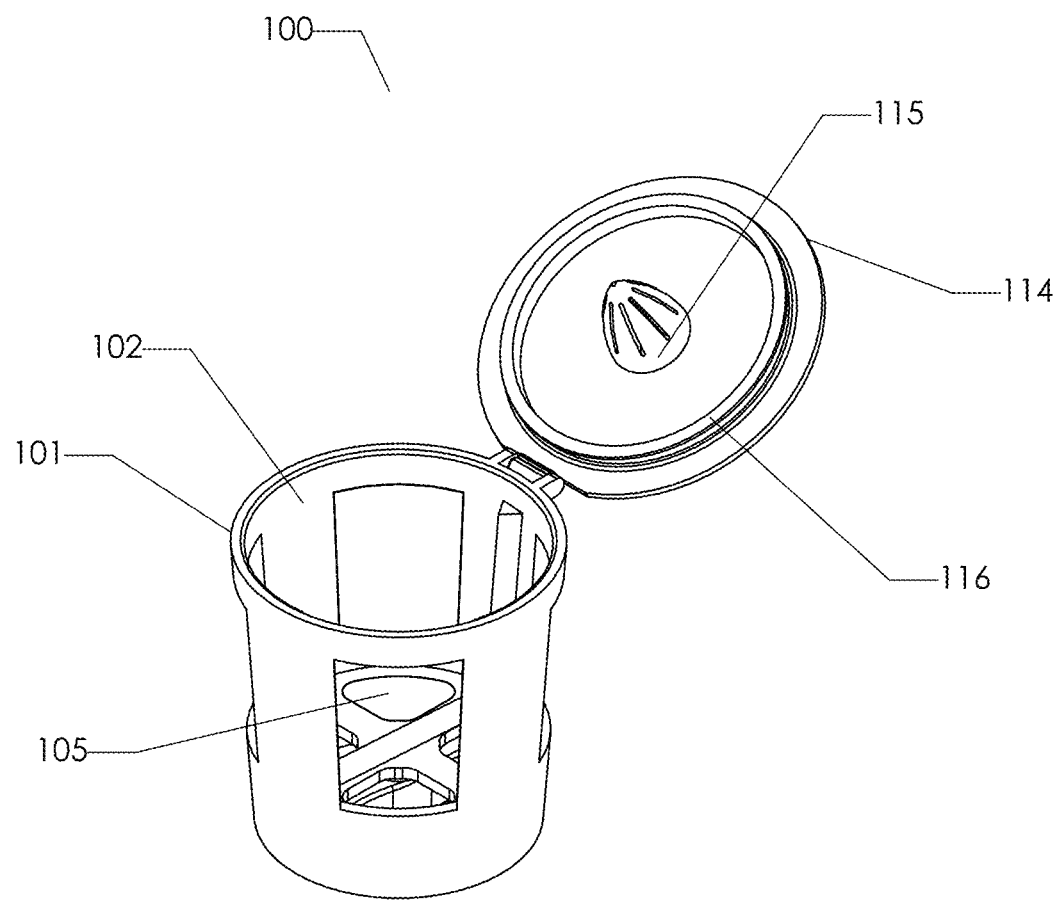
FIG. 4 illustrates an isometric top view of the present invention, showing the interior of the lid.

Optionally, as illustrated in FIG. 4, the reusable brewing filter, 100, comprises a lid, 114, wherein the lid has an interior surface, an exterior surface and an inlet port, 115. Wherein the inlet port, 115, allows water to be added to the interior of the shell and the at least one drain hole, 105, allows extract water to exit the interior of the shell, 101. In this embodiment, the lid, 114, further defines a lid seal, 116, which lid seal, 116, is a raised portion or cylinder that is the shape of the top section, 102, and which lid seal, 116, further has a cavity around the perimeter of the lid seal, 116, to hold a rubber gasket to allow the lid to be sealed to the top section, 102, and so that the lid, 114, it rests firmly and stably at the top section, 102, of the shell, 101.

Figure 5:
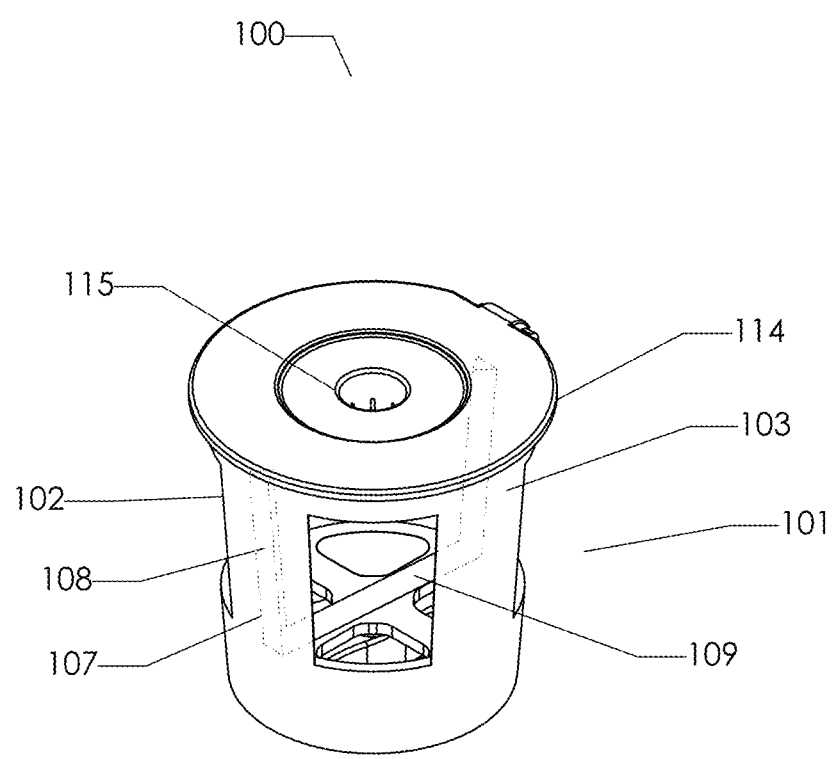
FIG. 5 illustrates the present invention assembled, and having the shell and scraper of the present invention in place and the lid attached.

FIG. 5, illustrates the reusable brewing filter, 100, assembled, and shows the lid, 114, the inlet port, 115, the shell, 101, the top section, 102, the at least one vertical side wall, 103, the base, 104, the cleaning scraper, 107, the at least one vertical cleaning wing, 108, and at least one horizontal cleaning member, 109.

Referring again to FIG. 1, the embodiment of the reusable brewing adapter, 100, has at least one vertical side wall which defines at least one open side window, 117, and further, wherein the at least one open side window, 117, is covered entirely by fine mesh screening, 118, having a screen mesh hole size of about 10 microns or larger.

In one embodiment, the screen mesh hole size is 20 microns or larger.

In another embodiment, the screen mesh hole size is 50 microns or larger.

Optionally, as shown in the embodiment illustrated in FIG. 1, the base, 104, further comprises at least one cross member, 119, the at least one cross member, 119, defines at least one open base window, 120, and further, wherein the at least one open base window, 120, is covered entirely by the fine mesh screening, 118.

In another embodiment, the at least one vertical side wall defines a plurality of perforations wherein the perforations allow water to exit and simultaneously retain finely ground coffee beans having a size of about 50 micrometers or larger.

In another embodiment, the base defines a plurality of perforations wherein the perforations allow water to exit and simultaneously retain finely ground coffee beans having a size of about 50 micrometers or larger.

Optionally, as in the embodiment illustrated in FIG. 1, the end of the vertical cylindrical shaft, 110, has a vertically bisected end section, 121, and wherein the vertically bisected end section, 121 terminates in retaining tabs, 122, which retaining tabs are exterior bumps or flanged terminal portions of the vertical cylindrical shaft, 110, and which engage with the indentations within the cleaning member retaining hole, 112, in order to lock the retaining tabs and the vertical cylindrical shaft, 110, in the cleaning member retaining hole, 112.

In one embodiment, the end of the vertical cylindrical shaft, 110, has external spiral threads.

In one embodiment, the wing lever, 111, has internal spiral threads that are capable of engaging with the external spiral threads of the vertical cylindrical shaft, 110, in order to attach the wing lever, 111, to the vertical cylindrical shaft, 110.

In one embodiment, the cleaning scraper, 107, sits within the shell, 101, the vertical cylindrical shaft, 110, is inserted into the shaft hole, 106, and the wing lever, 111, is attached to reusable brewing adapter, 100, by inserting the vertically bisected end section, 121, and retaining tabs, 122, into the cleaning member retaining hole, 112, so that the wing lever, 111, sits on the exterior surface of the base, 104, and may be rotated to allow the at least one vertical cleaning wing, 108, and the at least one horizontal cleaning member, 111, to scrape the interior surface of the at least one vertical side wall, 103, and the base, 104, respectively, in order to clean and remove spent coffee grounds.

In one embodiment, the cleaning scraper, 107, sits within the shell, 101, the vertical cylindrical shaft, 110, is inserted into the shaft hole, 106, and the wing lever, 111, is attached to the reusable brewing adapter, 100, by engaging and tightening the optional external spiral threads of the cylindrical shaft and the optional internal spiral threads of the wing lever cleaning member retaining hole so that the wing lever, 111, sits on the exterior surface of the base, 104, and may be rotated to allow the at least one vertical cleaning wing, 108, and the at least one horizontal cleaning member, 109, to scrape the interior surface of the at least one vertical side wall, 103, and the base, 104, respectively, in order to clean and remove spent coffee grounds.

In one embodiment, the lid has external spiral threads and the top has internal spiral threads that engage with the external spiral threads of the lid in order to attach and tighten the lid to the top.

In one embodiment, the reusable brewing adapter further comprises a hinge, wherein the shell has a hinge base, the lid has a hinge pin, and the hinge attaches the lid to the top section of the shell.

In one embodiment, the shell, 101, is a cylinder and the at least one vertical side wall, 103, comprises a rigid skeleton that defines the at least one open side window, 117. The fine mesh screening, 118, is cut in individual sections or one continuous section so as to fit and cover the at least one open side window, 117, or the entire interior surface of the shell, 101. This allows the fine mesh screening, 118, to completely cover the at least one open side window, 117, and act as a sieve for the ground coffee bean extraction process.

Figure 6:
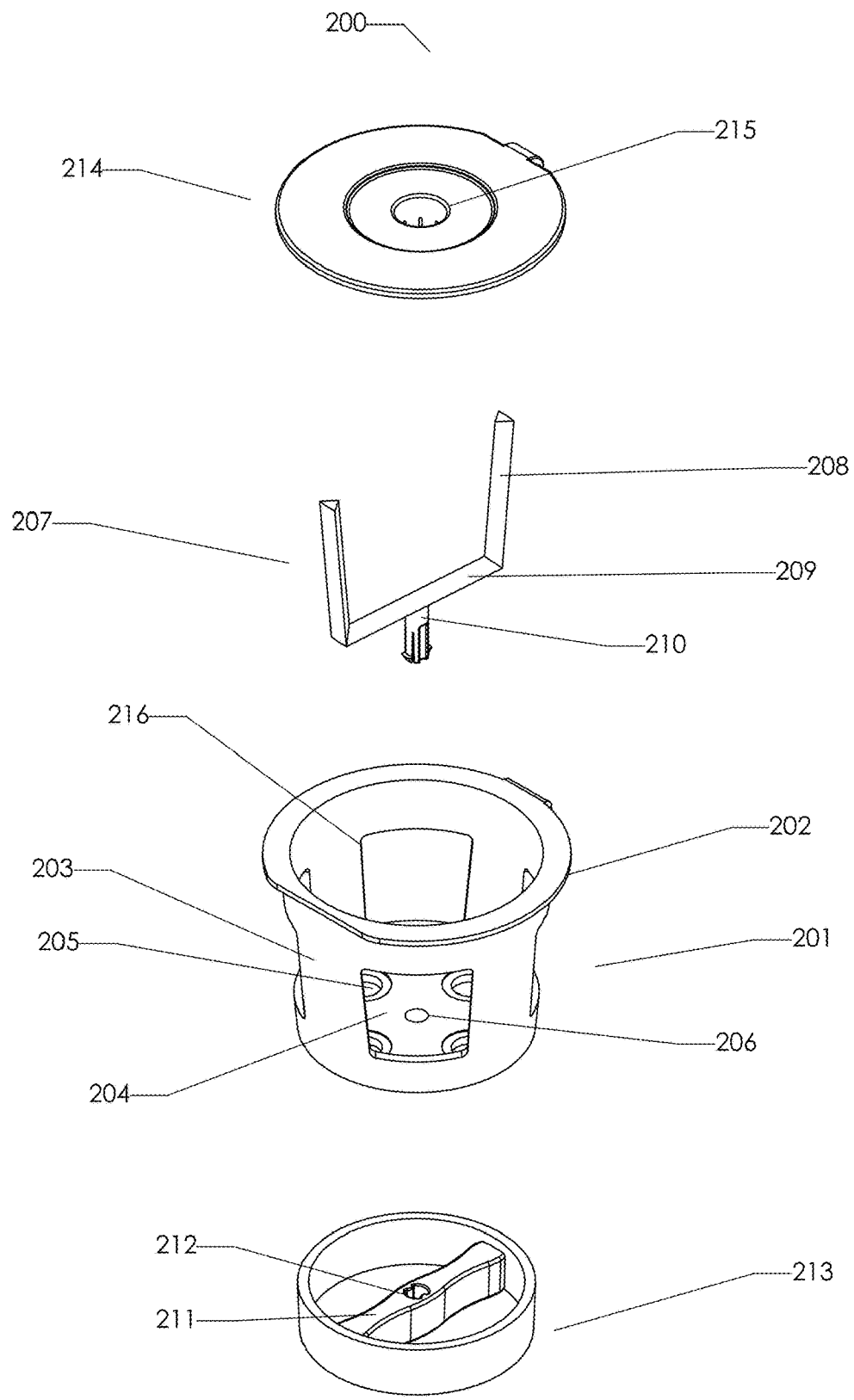
FIG. 6 illustrates a second embodiment of the present invention.

In a second embodiment, as illustrated in FIG. 6, the reusable brewing filter of the present invention, 200, further comprises an upper shell, 201, having an interior, an interior surface, an exterior surface, and a top section, 202, the upper shell, 201, further comprises at least one vertical side wall, 203, the at least one vertical side wall, 203, further has an interior surface and an exterior surface, the upper shell, 201, is further comprised of a base, 204, the base defines at least one drain hole, 205, and, separately, one shaft hole, 206. The reusable brewing filter, 200, further has a cleaning scraper, 207, the cleaning scraper, 207, further having at least one vertical cleaning wing, 208, and at least one horizontal cleaning member, 209, the at least one horizontal cleaning member, 209, further has a vertical cylindrical shaft, 210, formed therein at the center point, which vertical cylindrical shaft, 210, opposes the at least one vertical cleaning wing, 208, the at least one vertical cleaning wing, 208, is attached to or formed within the horizontal cleaning member, 209, the vertical cylindrical shaft, 210, has an end, the reusable brewing filter, 200, further has a wing lever, 211, the wing lever defines a cleaning member retaining hole, 212, formed therein at the midpoint of the wing lever, 211. The reusable brewing filter, 200, further has a lower shell, 213, wherein the wing lever, 211, is permanently attached to the lower shell, 213, by the vertical cylindrical shaft, 210, of the cleaning scraper, 207, which vertical cylindrical shaft, 210, is permanently attached to the wing lever, 211, and within the cleaning member retaining hole, 212. In operation, a user rotates the lower shell, 213, in either a clockwise or counterclockwise direction, which causes the horizontal cleaning member, 209, and the at least one vertical cleaning wing, 208, to rotate and scrape the at least one vertical side wall, 203, while the upper shell, 201, remains fixed. FIG. 6 also illustrates a drain hole, 205, a shaft hole, 206, a lid, 214, an inlet port, 215, and an optional at least one side window, 216, of the second embodiment.

Optionally, the second embodiment may include a fine mesh screen to cover the interior of the upper shell.

Alternatively, the shell may be comprised of a cone or sphere shape.

Alternatively, the reusable brewing adapter may be used in any situation where there is a brewing filter, pod, capsule, adapter, or other enclosure that holds unwanted material that needs to be ejected. Common applications, for example, include but are not limited to filtering coffee and tea extractions, beer brewing, wine making, food processing, blending, or juicing.

The present invention in any or all of its elements may be comprised of any metal that is suitable for brewing coffee that is to be consumed by a user. For example, stainless steel, aluminum, brass, gold, and titanium may used to form the reusable brewing adapter and the mesh screen of the present invention. A thermoplastic resin, for example, a polyester, polypropylene, polycarbonate may be used to mold the reusable brewing adapter. Optionally, a non-toxic bisphenol A (BPA) free plastic is used to mold the reusable brewing adapter.

The reusable brewing adapter may also be formed in part of a metal and in part of a thermoplastic resin. For example, the shell may be comprised of a thermoplastic resin and the mesh screen may be comprised of a stainless steel screen for a combination of durability and flexibility. The metal portions of the reusable brewing adapter may be formed, for example, from metal casting and can be accompanied by a lathe or mill machining process. The thermoplastic resin portions of the reusable brewing adapter may be formed, for example, by plastic injection molding using granules or other form of the desired thermoplastic resin.

In operation, one uses the reusable brewing adapter by loading the shell with ground coffee and the extracting or brewing the coffee. In one embodiment, the present invention holds enough ground coffee for what is typically a single serving of coffee to be extracted. The single serving amount may be one to two tablespoons of ground coffee. In another embodiment the present invention is large enough to hold more than two tablespoons of ground coffee to provide for extraction of more than one serving of coffee liquid.

After the brewing process is complete, in order to remove the content from the reusable brewing adapter, the user inverts the reusable brewing adapter over a receptacle, and twists the wing lever to scrape and eject spent ground coffee beans from the shell.

The variations in the elements of the invention will be readily understood by one of skill in the art to be interchangeable with the elements described herein. These descriptions of the litter sifter element variations in the present invention are intended to be exemplary and are not intended to be limiting

We claim:

1. A reusable brewing filter comprising: a shell, having an interior, an interior surface, an exterior surface, and a top section, the shell further comprising at least one vertical side wall, the at least one vertical side wall having an interior surface and an exterior surface, the shell further comprising a base, the base having an interior surface and an exterior surface, the base defining at least one drain hole and, separately, one shaft hole, a cleaning scraper, the cleaning scraper having at least one vertical cleaning wing and at least one horizontal cleaning member, the at least one horizontal cleaning member further having a vertical cylindrical shaft formed therein at the center point, which vertical cylindrical shaft opposes the at least one vertical cleaning wing, the vertical cylindrical shaft having an end, a wing lever having a bore-through with walls that define a cleaning member retaining hole, the walls of the cleaning member retaining hole having indentations therein, wherein the at least one drain hole allows extract water to exit the interior of the cylindrical shell, and wherein the vertical cylindrical shaft fits within the cleaning member retaining hole.

2. The reusable brewing filter of claim 1 further comprising a lid, the lid having an interior surface and an exterior surface and an inlet port, wherein the inlet port allows water to be added to the interior of the shell.

3. The reusable filter of claim 1 wherein the wing lever has a wing lever tab formed therein in order to facilitate use and spinning action of the wing lever.

4. The reusable brewing filter of claim 1 wherein the at least one vertical side wall defines at least one open side wall drainage space, and further, wherein the at least one open side wall drainage space is covered entirely by fine mesh screening having a screen mesh hole size of about 10 micrometers or larger.

5. The reusable brewing filter of claim 1 wherein the base further comprises at least one cross member, the at least one cross member defining at least one open base drainage space, and further, wherein the at least one open base drainage space is covered entirely by fine mesh screening having a screen mesh hole size of about 10 micrometers or larger.

6. The reusable brewing filter of claim 1 wherein the at least one vertical side wall and defines a plurality of perforations wherein the perforations allow water to exit and simultaneously retain finely ground coffee beans having a size of about 25 micrometers or larger.

7. The reusable brewing filter of claim 1 wherein the base defines a plurality of perforations wherein the perforations allow water to exit and simultaneously retain finely ground coffee beans having a size of about 25 micrometers or larger.

8. The reusable brewing filter of claim 1 wherein the at least one vertical cleaning wing intimately abuts the interior surface of the at least one vertical side wall and the at least one horizontal cleaning member intimately abuts the interior surface of the base.

9. The reusable brewing filter of claim 1 wherein the end of the vertical cylindrical shaft has a vertically bisected end section and wherein the vertically bisected end section terminates in retaining tabs.

10. The reusable brewing filter of claim 1 wherein the end of the vertical cylindrical shaft has external spiral threads.

11. The reusable brewing filter of claim 8 wherein the wing lever has internal spiral threads which are capable of engaging with the external spiral threads of the vertical cylindrical shaft.

12. The reusable brewing filter of claim 1 wherein the cleaning scraper sits within the shell, the vertical cylindrical shaft is inserted into the shaft hole, the retaining tabs fit or lock into the indentations of the cleaning member retaining hole of the wing lever, and the wing lever is attached to reusable brewing filter by inserting the bisected end and retaining tabs into the cleaning member retaining hole so that the wing lever sits on the exterior surface of the base and may be rotated to allow the at least one vertical cleaning wing and the at least one horizontal cleaning member to scrape the interior surface of the at least one vertical side wall and the base, respectively, in order to clean and remove spent coffee grounds.

13. The reusable brewing filter of claim 8 wherein the cleaning scraper sits within the shell, the vertical cylindrical shaft is inserted into the shaft hole, and the wing lever is attached to the reusable brewing adapter by engaging and tightening the external spiral threads of the vertical cylindrical shaft and the internal spiral threads of the wing lever cleaning member retaining hole so that the wing lever sits on the exterior surface of the base and may be rotated to allow the at least one vertical cleaning wing and the at least one horizontal cleaning member scrape the interior surface of the at least one vertical side wall and the base, respectively, in order to clean and remove spent coffee grounds.

14. The reusable brewing filter of claim 1, further comprising a hinge, wherein the shell has a hinge base, the lid has a hinge pin, and the hinge attaches the lid to the top section of the shell.

15. The reusable brewing filter of claim 1 wherein the lid has external spiral threads and the top has internal spiral threads that engage with the external spiral threads of the lid in order to affix and tighten the lid to the top.

16. A reusable brewing filter comprising: an upper shell, having an interior, an interior surface, an exterior surface, and a top section, the upper shell further comprising at least one vertical side wall, the at least one vertical side wall having an interior surface and an exterior surface, the upper shell further comprising a base defining at least one drain hole and, separately, one shaft hole, a cleaning scraper, the cleaning scraper having at least one vertical cleaning wing and at least one horizontal cleaning member, the at least one horizontal cleaning member further having a vertical cylindrical shaft formed therein at the center point, which vertical cylindrical shaft opposes the at least one vertical cleaning wing, the vertical cylindrical shaft having an end, a wing lever defining a cleaning member retaining hole formed therein at the midpoint of the wing lever, a lower shell, the lower shell having the wing lever permanently attached, the vertical cylindrical shaft of the cleaning scraper is permanently attached to the wing lever through the cleaning member retaining hole, and rotation of the lower shell results in rotation of the horizontal cleaning member and the at least one vertical cleaning wing, and scraping of the at least one vertical side wall while the upper shell remains fixed.

* * * * *